United States Patent
Kamura et al.

[11] Patent Number: 5,875,756
[45] Date of Patent: Mar. 2, 1999

[54] IGNITION TIMING CONTROL SYSTEM FOR IN-CYLINDER INJECTION INTERNAL COMBUSTION ENGINE

[75] Inventors: Hitoshi Kamura; Kenjiro Hatayama, both of Kyoto; Atsuyoshi Kojima, Toyota; Hiroki Tamura, Hoi-gun, all of Japan

[73] Assignee: Mitsubishi Jidosha Kogyo Kabushiki Kaisha, Tokyo, Japan

[21] Appl. No.: 919,614

[22] Filed: Aug. 28, 1997

[30] Foreign Application Priority Data

Aug. 28, 1996 [JP] Japan ................................. 8-227235

[51] Int. Cl.⁶ ............................. F02B 17/00; F02P 5/15
[52] U.S. Cl. ......................... 123/295; 123/305; 123/406
[58] Field of Search ............................. 123/305, 295, 123/406, 415, 416, 417, 422, 423

[56] References Cited

U.S. PATENT DOCUMENTS

| | | | |
|---|---|---|---|
| 4,866,620 | 9/1989 | Abe et al. | 123/417 |
| 4,942,860 | 7/1990 | Chujo et al. | 123/417 |
| 5,078,107 | 1/1992 | Morikawa | 123/305 |
| 5,313,920 | 5/1994 | Matsushita | 123/295 |
| 5,331,933 | 7/1994 | Matsushita | 123/295 |
| 5,722,362 | 3/1998 | Takano et al. | 123/295 |
| 5,722,363 | 3/1998 | Iida et al. | 123/305 |
| 5,740,777 | 4/1998 | Yamamoto et al. | 123/305 |
| 5,749,334 | 5/1998 | Oda et al. | 123/305 |

FOREIGN PATENT DOCUMENTS

830460B2  3/1996  Japan .

Primary Examiner—Erick R. Solis

[57] ABSTRACT

An ignition timing control system is provided for an in-cylinder injection internal combustion engine to reduce a torque shock upon switching a fuel injection mode between a compression-stroke injection mode, in which an injection of fuel is performed primarily in a compression stroke, and an intake-stroke injection mode, in which an injection of fuel is performed primarily in an intake stroke, in accordance with an operation state of said internal combustion engine. The ignition timing control system is provided with an injection timing correction unit for correcting ignition timing of a spark plug, which is arranged in a combustion chamber, upon switching said fuel injection mode. A correction amount for ignition timing, by which said ignition timing is corrected by said ignition timing correction unit upon switching from said compression-stroke injection mode to said intake-stroke injection mode, is greater than a correction amount for ignition timing, by which said ignition timing is corrected upon switching from said intake-stroke injection mode to said compression-stroke injection mode.

4 Claims, 8 Drawing Sheets

IGNITION TIMING CONTROL SYSTEM FOR IN-CYLINDER INJECTION INTERNAL COMBUSTION ENGINE

BACKGROUND OF THE INVENTION a) Field of the Invention

This invention relates to an ignition timing control system for use with an in-cylinder injection internal combustion engine in which a fuel injection mode can be switched, and especially to an ignition timing control system for an in-cylinder injection internal combustion engine, which can reduce a torque shock upon switching the fuel injection mode.

b) Description of the Related Art

As engines for automotive vehicles, lean-burn engines with a combustion air/fuel ratio set higher than a stoichiometric air/fuel ratio from the viewpoint of an improvement in fuel economy have been proposed in recent years.

A lean-burn engine can generally bring about a greater improvement in fuel economy as its combustion air/fuel ratio becomes higher. Due to deterioration in combustion, however, there is a limitation to the increase in the air/fuel ratio. As a method for raising this limitation as much as possible, a technique has been proposed to perform stratified combustion by making an air-fuel mixture as rich as possible around a point of ignition within a combustion chamber while maintaining a high overall air/fuel ratio within the combustion chamber.

Further, to permit operation of engines with still leaner air-fuel mixtures, in-cylinder injection engines in which fuel is injected directly into cylinders have also been developed. According to these in-cylinder injection engines, fuel can be injected, for example, at a late stage of a compression stroke. Operation of high fuel economy is therefore feasible with an air-fuel mixture extremely lean as a whole while establishing a rich air-fuel mixture only in the vicinity of a spark plug and hence assuring good combustibility by producing a stratified vertical swirl within a cylinder and injecting fuel into the stratified vertical swirl immediately before ignition by the spark plug (for example, at a late stage of a compression stroke).

Upon performing lean-burn operation, the rate of NOx emission is known to decrease as the combustion air/fuel ratio is set higher. In stratified lean-burn operation, however, the air/fuel ratio is relatively low in the vicinity of the point of ignition, thereby imposing a certain limitation on the reduction of the rate of NOx emission.

As a method for achieving such a reduction in the rate of NOx emission, it is contemplated to conduct recirculation of exhaust gas (EGR). For example, a great deal of exhaust gas may be recirculated in a compression-stroke lean fuel injection mode to achieve stabilization of combustion and a further reduction in the rate of NOx emission.

Further, in such internal combustion engines, target exhaust gas recirculation rates are set according to individual operation modes (fuel injection modes). Upon switching the operation mode, control of an EGR valve is performed so that the exhaust gas recirculation rate can promptly be rendered equal to the corresponding target exhaust gas recirculation rate.

Upon switching the fuel injection mode (operation mode) as described above, an engine torque may vary, leading to production of a shock (torque shock) in some instances.

With a view to overcoming this problem, a target air/fuel ratio A/F is changed by controlling a quantity of air through an air bypass valve (ABV) or an injection quantity of fuel through a fuel injection valve (injector) so that variations in engine torque can be reduced. There is however a delay in the feeding of air into a combustion chamber especially when the fuel injection mode is switched from a compression-stroke fuel injection operation mode to an intake-stroke fuel injection operation mode. Upon such switching of an operation mode, a shock may still not be reduced sufficiently in some instances.

SUMMARY OF THE INVENTION

With the foregoing problems in view, the present invention has as an object thereof the provision of an injection timing control system for an in-cylinder injection internal combustion engine, in which a fuel injection mode can be switched, so that a torque shock to be produced upon switching the fuel injection mode can be reduced.

In one aspect of the present invention, there is thus provided an ignition timing control system for an in-cylinder injection internal combustion engine in which a fuel injection mode can be switched between a compression-stroke injection mode, in which an injection of fuel is performed primarily in a compression stroke, and an intake-stroke injection mode, in which an injection of fuel is performed primarily in an intake stroke, in accordance with an operation state of the internal combustion engine, characterized in that the system is provided with an ignition timing correction unit for correcting ignition timing of a spark plug, which is arranged in a combustion chamber, upon switching the fuel injection mode, and a correction amount for ignition timing, by which the ignition timing is corrected by the ignition timing correction unit upon switching from the compression-stroke injection mode to the intake-stroke injection mode, is greater than a correction amount for ignition timing, by which the ignition timing is corrected upon switching from the intake-stroke injection mode to the compression-stroke injection mode.

Preferably, the internal combustion engine is provided with a target air/fuel ratio setting unit for setting a target air/fuel ratio for the fuel injection mode in accordance with an operation state of the internal combustion engine, and a target air/fuel ratio correction unit for correcting a change of the target air/fuel ratio, which has been set by the target air/fuel ratio setting unit, upon switching the fuel injection mode; the target air/fuel ratio setting unit sets the target air/fuel ratio at an air/fuel ratio leaner than a stoichiometric air/fuel ratio in the compression-stroke injection mode and, in the intake-stroke injection mode, at an air/fuel ratio richer than the target air/fuel ratio for the compression-stroke injection mode; upon switching the fuel injection mode, the target air/fuel ratio correction unit corrects a target air/fuel ratio for a pre-switching fuel injection mode toward a fuel-injection-mode-switching-time air/fuel ratio, which falls between the target air/fuel ratio for the pre-switching fuel injection mode and a target air/fuel ratio for a post-switching fuel injection mode, and then changes the corrected target air/fuel ratio from a value around the fuel-injection-mode-switching-time air/fuel ratio toward the target air/fuel ratio for the post-switching fuel injection mode set by the target air/fuel ratio setting unit; and in the intake-stroke injection mode, the ignition timing correction unit is actuated upon an elapse of a predetermined time period since commencement of a correction of the target air/fuel ratio toward the mode-switching-time air/fuel ratio by the target air/fuel ratio correction unit.

Further, the correction amount of the ignition timing as set by the ignition timing correction unit may be set based on at least one of a difference in speed of the internal combustion engine, a degree of occurrence of knocking in the internal combustion engine and the operation state of the internal combustion engine.

In addition, the operation state of the internal combustion engine may desirably be within an operation region set by at least speeds of the internal combustion engine and values correlated to loads on the internal combustion engine.

Owing to the construction as described above, there is the advantage that a torque shock to be produced upon switching the fuel injection mode can be reduced considerably. Further, the correction of ignition timing according to a response lag in a quantity of air makes it possible to precisely perform control of the ignition timing in accordance with an injection quantity of fuel, thereby bringing about the advantage that drivability can be significantly improved.

Furthermore, the setting of a correction amount for the ignition timing, said correction amount being set by the ignition timing correction unit, by using an operation region set by a difference in speed of the internal combustion engine, a degree of occurrence of knocking in the internal combustion engine and a speed and load of the internal combustion engine has the advantage that an optimal ignition timing correction amount corresponding to an operation state of the engine can be set.

Moreover, the reduction of a torque shock to be produced upon switching the fuel injection mode does not require addition of any new parts or components, thereby bringing about the advantage that the system according to the present invention can be realized at low cost without any substantial increase in weight.

DESCRIPTION OF THE PREFERRED EMBODIMENT

Figure 1:
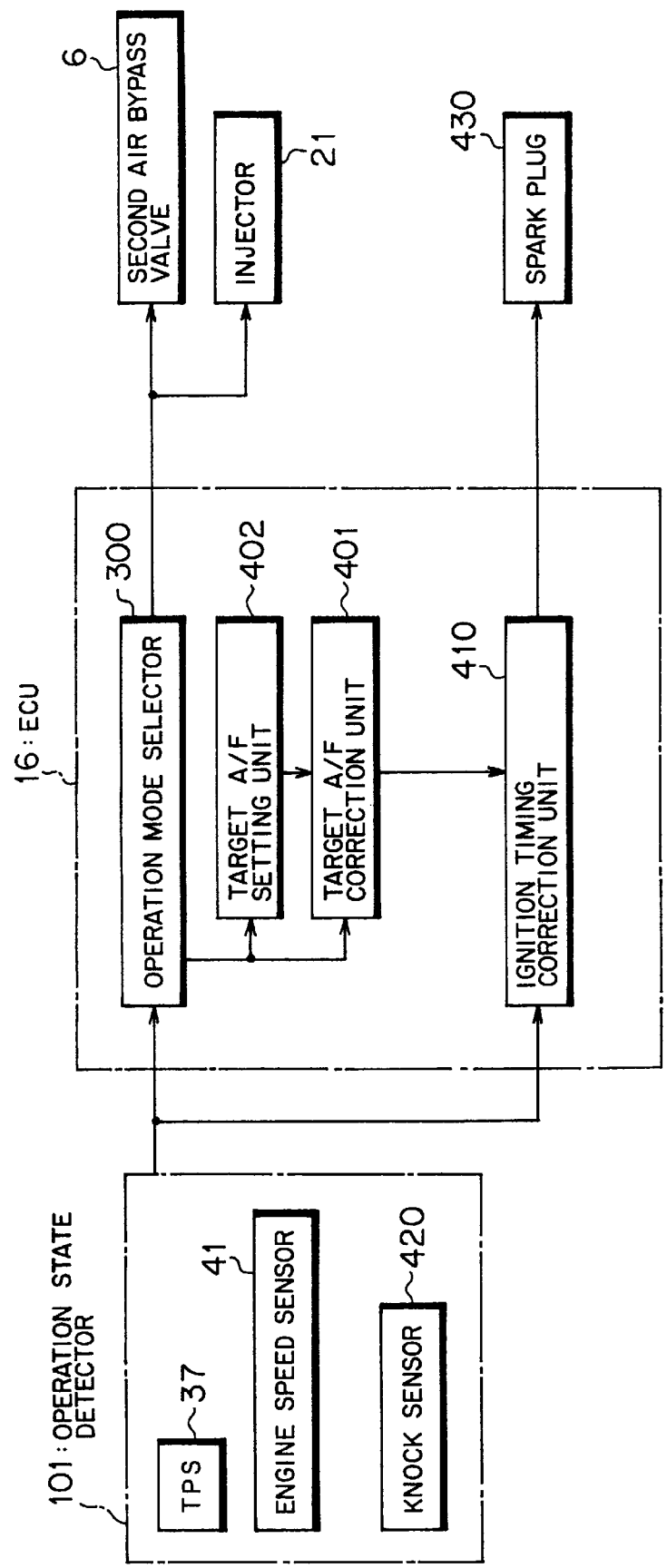
FIG. 1 is a functional block diagram focusing on functions of essential elements in an ignition timing control system according to one embodiment of the present invention for an in-cylinder injection internal combustion engine.

With reference to the drawings, a description will hereinafter be made about the ignition timing control system according to the embodiment of the present invention for the in-cylinder injection internal combustion engine. The system is applied to the in-cylinder injection internal combustion engine (hereinafter called the "in-cylinder injection engine" for the sake of brevity) illustrated in FIG. 4.

The construction of the in-cylinder injection engine equipped with the system will first be described with reference to FIG. 4, in which there are shown an engine main body 1, an intake passage 2, a throttle-valve-installed portion 3, an air cleaner 4, a bypass passage (second bypass passage) 5, and a second air bypass valve (#2ABV) 6 capable of controlling a quantity of air to be fed through the second bypass passage 5. The intake passage 2 is constructed of an intake pipe 7, a surge tank 8 and an intake manifold 9, which are connected in this order from an upstream side. The second bypass passage 5 is arranged on an upstream side of the surge tank 8. The second air bypass valve 6 is driven to a desired opening by a stepping motor. As an alternative, this second air bypass valve 6 may be in the form of a solenoid-operated valve which is designed to be adjustable in opening under duty control.

Further, numeral 12 indicates a bypass unit, which is equipped with an idling speed control function and is composed of a bypass passage (first bypass passage) 13 and a first air bypass valve (#1ABV) 14. The first air bypass valve 14 is driven by an unillustrated stepping motor. Designated at numeral 15 is a throttle valve. The first bypass passage 13 and the second bypass passage 5 are connected at their upstream end and downstream end to the intake passage 2, respectively, so that they extend bypassing a portion of the intake passage 2 where the throttle valve 15 is installed.

Open/close control of the first air bypass valve 14 and the second air bypass valve 6 is performed through an electronic control unit (ECU) 16 as a controller.

Designated further at numerals 17 and 18 are an exhaust passage and a combustion chamber, respectively. An intake valve 19 and an exhaust valve 20 are arranged in openings of the intake passage 2 and the exhaust passage 17 to the combustion chamber 18, that is, an intake port 2A and an exhaust port 17A, respectively.

Numeral 21 indicates a fuel injection valve (hereinafter called the "injector"). In the illustrated engine, the injector 21 is arranged to inject fuel directly into the combustion chamber 18.

Also illustrated are a fuel tank 22, fuel feed lines 23A–23E, a low-pressure fuel pump 24, a high-pressure fuel pump 25, a low-pressure regulator 26, a high-pressure regulator 27, and a delivery pipe 28. Accordingly, fuel is fed out of the fuel tank 22 by the low-pressure fuel pump 24 and is then pressurized to a predetermined high-pressure level by the high-pressure fuel pump 25. At this pressure level, the fuel is then fed to the injector 21 by way of the fuel feed lines 23A,23B and the delivery pipe 28. In the course of this feeding, the pressure of the fuel delivered out of the low-pressure fuel pump 24 is controlled by the low-pressure regulator 26, and the pressure of the fuel pressurized by the high-pressure fuel pump 25 and guided to the delivery pipe 28 is controlled by the high-pressure regulator 27.

There are also shown an exhaust gas recirculation passage (hereinafter called the "EGR passage") 29 for recirculating emission gas (exhaust gas) from the exhaust passage 17 into the intake passage 2 in the engine 1, a stepping-motor-operated valve (hereinafter called the "EGR valve") 30 as a unit for adjusting the recirculation rate of exhaust gas to be recirculated into the intake passage 2 through the EGR passage 29, a flow passage 31 for returning blowby gas, a passage 32 for positively ventilating a crankcase, a valve 33 for positively ventilating the crankcase, a canister 34, and an exhaust gas purification catalyst (a three-way catalyst in this embodiment) 35.

An exhaust gas recirculation system (EGR system) 200 is constructed primarily of the EGR passage 29 and the EGR valve 30.

Figure 4:
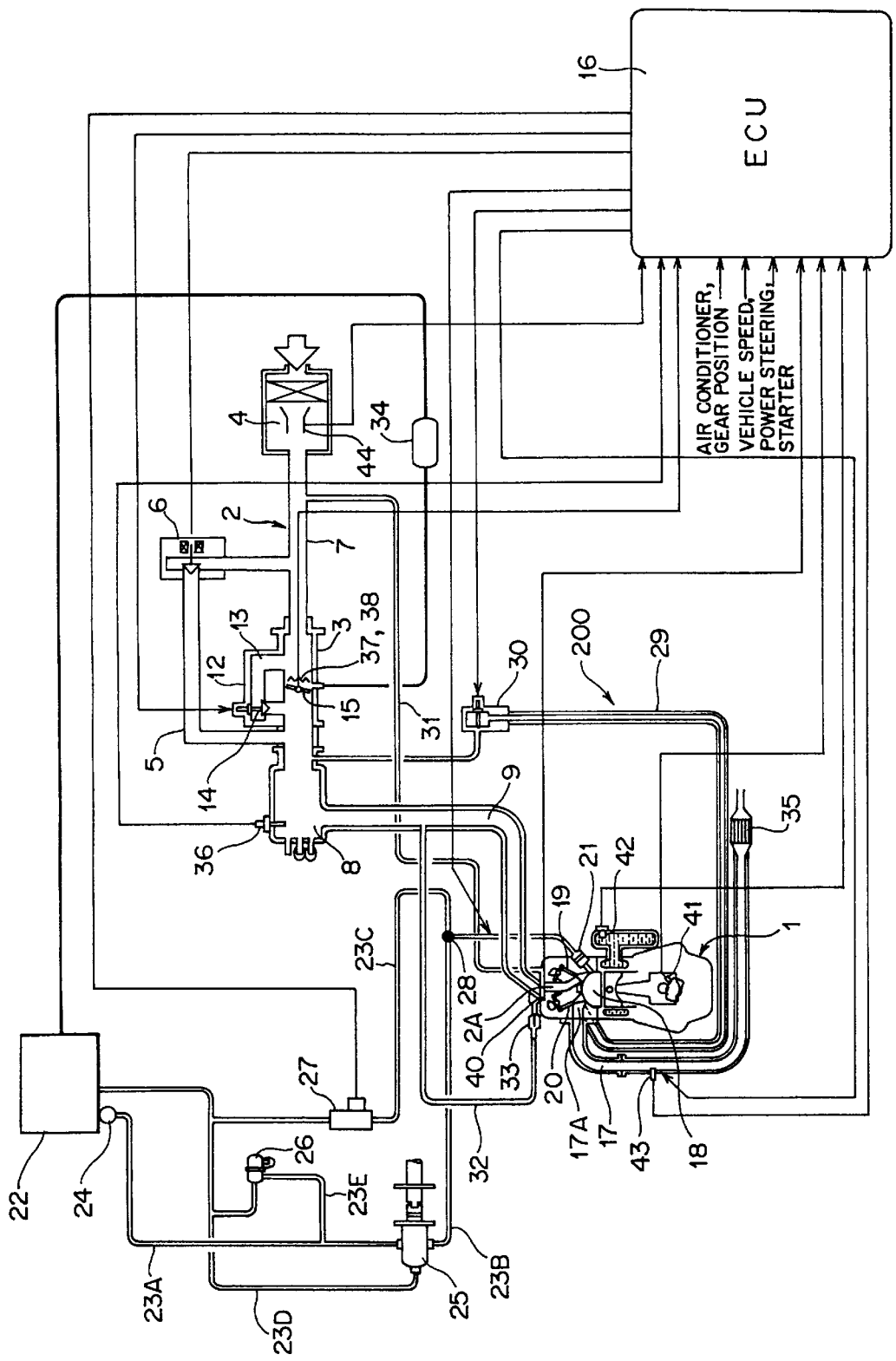
FIG. 4 is a schematic diagram showing the overall construction of the in-cylinder injection internal combustion engine to which the ignition timing control system according to the embodiment of the present invention is applied.

As is shown in FIG. 4, ECU 16 performs open/close control of the first air bypass valve 14 and the second air bypass valve 6 and control of their openings as well as control of the injector 21, an ignition coil for a spark plug (both not shown) and the EGR valve 30 and control of a fuel pressure by the high-pressure regulator 27. As is also illustrated in FIG. 4, arranged for these control are an airflow sensor 44, an inducted air temperature sensor 36, a throttle position sensor (TPS) 37 for detecting a throttle position, an idling switch 38, an air conditioner switch (not shown), a gear position sensor (not shown), a vehicle speed sensor (not shown), a power steering switch (not shown) for detecting a state of operation of a power steering system, a starter switch (not shown), a first cylinder detection sensor 40, a crank angle sensor 41, a coolant temperature sensor 42 for detecting a temperature of engine coolant, an $O_2$ sensor 43 for detecting a concentration of oxygen in exhaust gas, and the like. These sensors are connected to ECU 16. Incidentally, the number of revolutions of the engine (engine speed) can be calculated based on the crank angle sensor 41. For example, ECU 16 is provided with engine speed computing function for this purpose. Although an engine speed sensor is constructed of the crank angle sensor 41 and the engine speed computing function, the crank angle sensor 41 will also called the "engine speed sensor" herein for the sake of convenience.

As is depicted in FIG. 1, these throttle position sensor (TPS) 37 and engine speed sensor 41 and a knock sensor 420, which will be described subsequently herein, make up an operation state detection unit 101 for detecting an operation state of the engine.

Based on the control block diagram of FIG. 5, a description will now be made about details of fundamental control of the engine through ECU 16.

This engine is an engine in which combustion is switched between premixed combustion and stratified lean combustion in accordance with an operation state. Premixed combustion can be established by injecting fuel evenly into the combustion chamber 18, while stratified lean combustion can be achieved by having injected fuel localized around an unillustrated spark plug arranged facing on the combustion chamber 18.

As engine operation modes (fuel injection modes), the engine is provided with 4 modes, that is, a late lean-combustion operation mode (late lean mode) in which an injection of fuel is performed in a compression stroke to perform stratified lean combustion, an early lean-combustion operation mode (early lean mode) in which an injection of fuel is performed in an intake stroke to perform premixed combustion, a stoichiometric feedback combustion operation mode (stoichiometric operation mode), and an open-loop combustion operation mode (stoichiometric operation mode or enriched operation mode). In each of these modes, two submodes are set, one actuating EGR and the other stopping EGR. In accordance with an operation state of the engine, a running state of a vehicle and the like, one of these modes are selected to perform control of fuel feeding.

For this purpose, ECU 16 is inputted with information on a state of operation of the engine as detected by the operation state detection unit 101, specifically with an engine load Pe and an engine speed Ne as shown in FIG. 1. At ECU 16, one of the above-described operation modes is selected by an operation mode selector 300 in accordance with the operation state of the engine (Pe and Ne in this embodiment) so inputted.

As is shown in FIG. 1, ECU 16 is also provided with a target air/fuel ratio setting unit 402. At this target air/fuel ratio setting unit 402, a target air/fuel ratio A/F is set based on one of the operation modes selected as described above and also depending on an operation state (Pe,Ne) of the engine. Based on the thus-set target air/fuel ratio A/F, feeding of fuel by the fuel injection valve 21 arranged for each cylinder is controlled.

Figure 6:
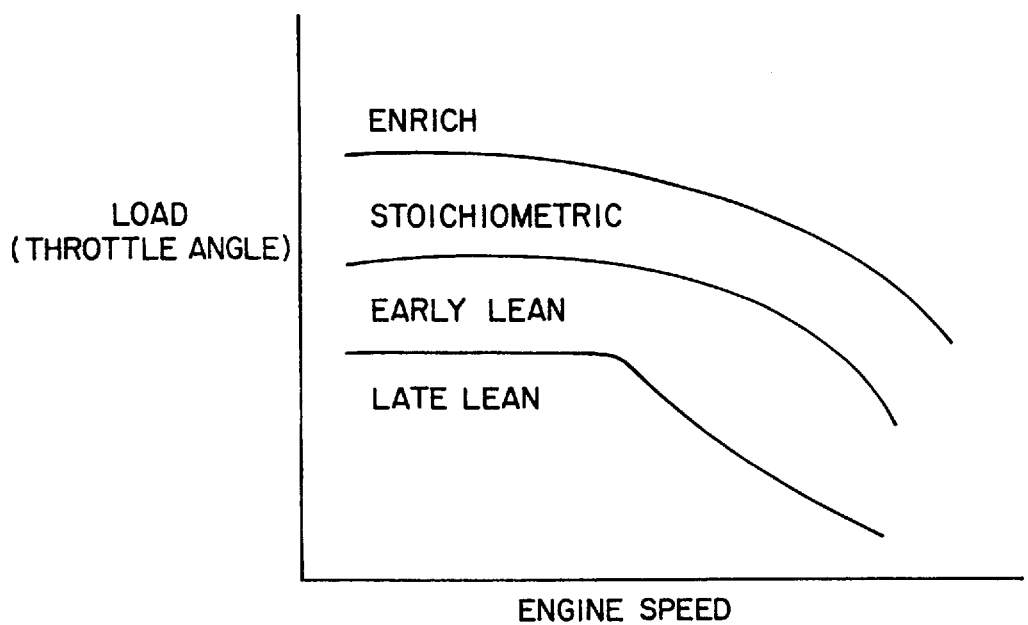
FIG. 6 is a diagram illustrating operation modes of the in-cylinder injection internal combustion engine to which the ignition timing control system according to the embodiment of the present invention is applied.

In accordance with the engine speed Ne and the target engine load Pe, the enriched operation mode, the stoichiometric operation mode, the early lean mode and the late lean mode are generally set in such regions as shown in FIG. 6.

Among the above-mentioned modes, the late lean mode can achieve leanest combustion (air/fuel ratio: about 30 to 40). In this mode, an injection of fuel is performed at a stage extremely close of an ignition time, for example, at a late stage of a compression stroke and moreover, the fuel is caused to concentrate in the vicinity of the spark plug to locally establish a rich air/fuel mixture there, so that fuel-saving operation is performed while assuring good ignitability and combustion stability although the air-fuel mixture is controlled lean as a whole.

The early lean mode can also achieve lean combustion (air/fuel ratio: about 20 to 24). According to this mode, an injection of fuel is performed in an intake stroke, that is, earlier than an injection of fuel in the late lean mode and the fuel is then allowed to spread throughout the combustion chamber, so that fuel-saving operation is performed while assuring good ignitability and combustion stability and a certain magnitude of power output although the overall air/fuel ratio is controlled lean.

The stoichiometric operation mode makes it possible to efficiently obtain a sufficient engine output while maintaining an air/fuel ratio in a stoichiometric level or at a level close to the stoichiometric level on the basis of an output from the $O_2$ sensor.

According to the open-loop combustion operation mode, combustion is performed at a stoichiometric air/fuel ratio or at a level richer than the stoichiometric level under open-loop control so that a sufficient power output can be obtained upon acceleration, start-up or the like.

A description will first be made of the opening control of the respective valves 6,14. ECU 16 is provided with a function that sets a required quantity of air in accordance with an operation state of the engine. In accordance with the required air quantity so set, the valves 6,14 are both controlled in opening.

Figure 5:
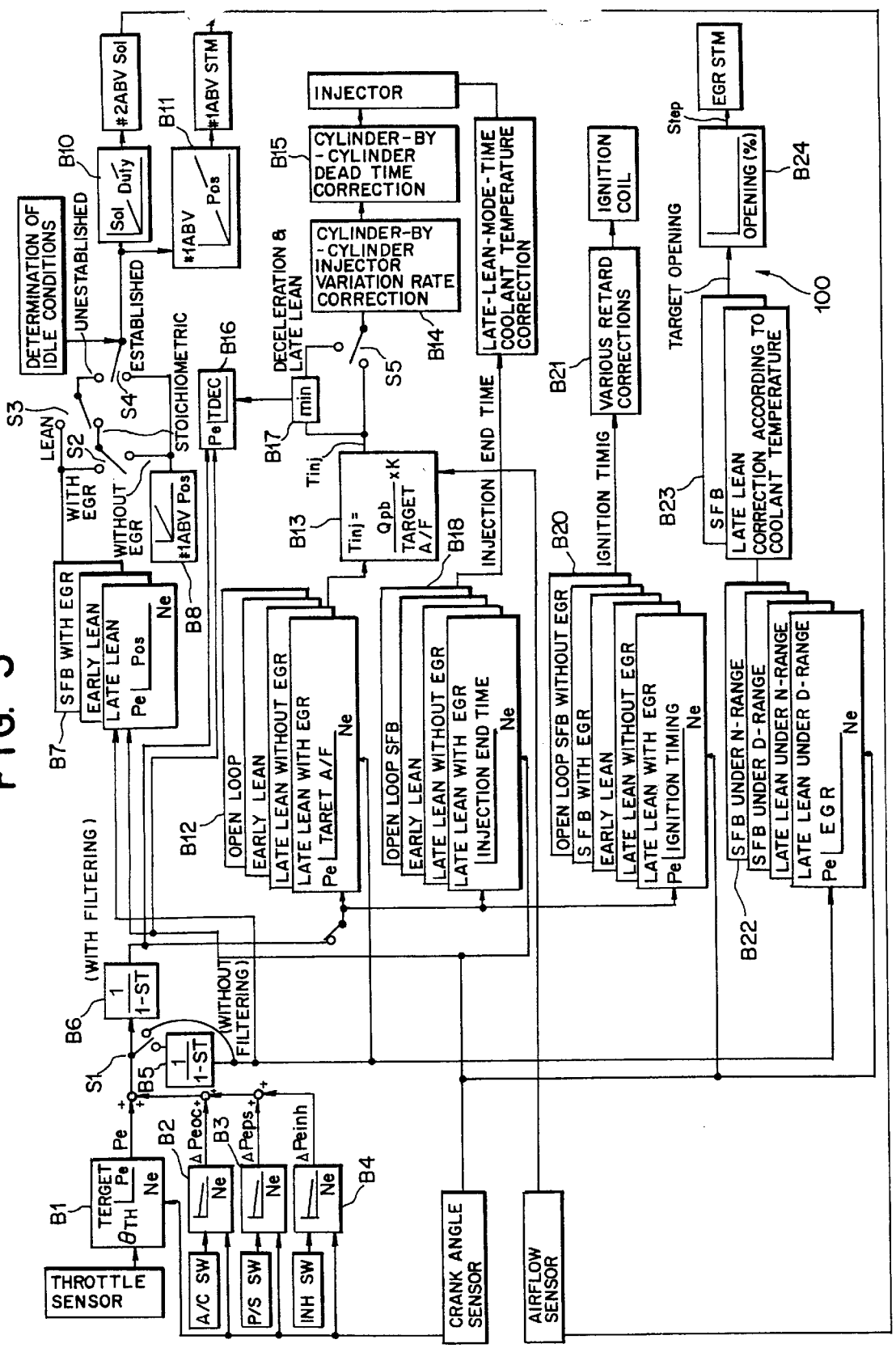
FIG. 5 is a functional block diagram of the in-cylinder injection internal combustion engine to which the ignition timing control system according to the embodiment of the present invention is applied.

Described specifically, a target engine load (target Pe) is first set as shown in FIG. 5, namely, based on a throttle position $\theta_{th}$ detected by the throttle position sensor or based on an accelerator position obtained from an unillustrated accelerator position sensor and an engine speed Ne computed based on detection information from the crank angle sensor while making reference to a map (Block B1).

On the other hand, if an air conditioner is found to be "ON" on the basis of information from the air conditioner switch, an air-conditioner-associated correction amount ΔPeac is set based on an engine speed Ne while making reference to a map (Block B2). If the power steering system is found to be "ON" on the basis of information from the power steering switch, a power-steering-associated correction amount ΔPeps is set based on an engine speed Ne while making reference to a map (Block B3). If the engine is found to be at a start-up on the basis of information from the inhibitor switch, an inhibitor-associated correction amount ΔPeinh is set from an engine speed Ne while making reference to a map (Block B4).

By these correction amounts ΔPeac,ΔPeps,ΔPeinh, the target Pe is corrected as needed. The target Pe so corrected is then filtered through a switch S1 as needed (Block B5). From the thus-obtained target Pe and an engine speed Ne, a control amount Pos for the openings of the valves is set in accordance with the required air quantity (or, a target inducted air quantity) Q while making reference to a map.

Upon setting this control amount Pos, a map corresponding to an operation state of the engine is selected from plural maps and is then used as shown in Block B7. Through switches S2,S3, a signal corresponding to the operation state of the engine is outputted. In the illustrated embodiment, maps have been recorded for three modes of operation state of the engine, that is, the late lean mode in which leanest combustion is performed, the early lean mode in which second leanest combustion, next to the late lean mode, is performed, and the stoichiometric operation mode with EGR. A required air quantity is set only when the engine is in one of these modes.

When an idling operation state is established by a switch S4, a control amount #1ABV Pos (in this case, a target opening primarily for the first air bypass valve) is set for a required air quantity (or a target inducted air quantity) #1ABVQ under feedback control of an engine speed as shown in Block B8.

A functional element for setting a quantity corresponding to the required air quantity Q, #1ABVQ, through the above-described Blocks B7,B8 corresponds to a required air quantity setting unit (not shown).

In accordance with the thus-obtained control amount Pos or #1ABV Pos, setting of an opening or position of the second air bypass valve 6 or setting of its duty ratio is conducted (Block B10) and setting of an opening or position of the first air bypass valve 14 is performed (Block B11), whereby the second air bypass valve 6 and the first air bypass valve 14 are controlled in positions as needed.

Also referring to FIG. 5, a description will be made about control of each of the injector 21, the ignition coil and EGR.

For driving the injector 21, it is necessary to set an injection start time and an injection end time of the injector 21. In this embodiment, an injector drive duration inj and an injection end time of the injector 21 are set. By calculating back an injection start time of the injector 21 on the basis of these injector drive duration and injection end time, the timing of drive of the injector 21 is determined. These settings are performed at ECU 16 in accordance with an operation state of the engine.

For the setting of the injector drive duration inj, an air/fuel ratio A/F is first set from the corrected target Pe, which has been subjected to filtering (Block B6), and an engine speed Ne while making reference to a map (Block B12). As maps for this setting, four maps have also been recorded for the late lean mode with EGR, the late lean mode without EGR, the early lean mode and the open-loop mode. In accordance with an operation state of the engine, one of these maps is selected and used.

From the thus-obtained air/fuel ratio A/F and an inducted air quantity Qpb detected by the airflow sensor, an injector drive duration inj is calculated (Block B13).

The injector drive duration inj is then subjected to cylinder-by-cylinder injector variation rate correction (Block B14) and also to cylinder-by-cylinder dead time correction (Block B15). On the other hand, a deceleration-time injecting duration DEC is calculated from the target Pe and the engine speed Ne (Block B16). When the vehicle is under deceleration and the engine is in the later lean operation mode, the smaller one of the injector drive duration inj obtained in Block B13 and the deceleration-time injecting duration DEC is selected through a switch S5 (Block B17) and is determined to be an injector drive duration.

Setting of an injection end time for the injector 21 is also conducted based on the corrected target Pe, which has been subjected to filtering (Block B6), and the engine speed Ne while making reference to a map (Block B18). As maps for this setting, four maps have also been recorded for the late lean mode with EGR, the late lean mode without EGR, the early lean mode, and the open-loop operation or stoichiometric feedback operation mode. In accordance with an operation state of the engine, one of these maps is selected and used.

In the case of the late lean mode, the injection end time obtained as described above is subjected to coolant temperature correction, whereby an injection end time is obtained.

Based on the injector drive duration inj and the injection end time obtained as described above, drive of the injector 21 is performed.

Further, ignition timing of the spark plug by the ignition coil is also set based on the corrected target Pe, which has been subjected to filtering (Block B6), and the engine speed Ne while making reference to a map (Block B20). As maps for this setting, five maps have also been recorded for the late lean mode with EGR, the late lean mode without EGR, the early lean mode, the stoichiometric feedback operation mode with EGR, and the open-loop operation or stoichiometric feedback operation mode without EGR. Various retard corrections are applied to the thus-obtained ignition time (Block B21) and based on the resultant ignition time, control of the ignition coil is performed.

Concerning control of a flow rate of EGR, a flow rate of EGR is set based on the corrected target Pe, which has been subjected to filtering (Block B6), and the engine speed Ne while making reference to a map (Block B22). As maps for this setting, four maps have been recorded for the late lean mode under the D range, the late lean mode under the N range, the stoichiometric feedback operation mode under the D range, and the stoichiometric feedback operation mode under the N-range.

The thus-obtained flow rate of EGR is subjected to coolant temperature correction (Block B23), and a control amount (duty ratio) is set in accordance with an opening (Block B24) to perform the control of the flow rate of EGR. A target EGR rate setting unit 100 is composed of these Blocks B22, Block B23 and Block B24.

Concerning the coolant temperature correction (Block B23), a map corresponding to an operation mode of the engine is also used (in the illustrated embodiment, two maps have been recorded, one for the late lean mode and the other for the stoichiometric feedback operation mode).

A description will next be made about the functions of the essential elements in the present invention. This system is to reduce a torque shock, which is associated with switching of the fuel injection mode, by correcting an ignition time of the spark plug upon switching the fuel injection mode from the compression-stroke fuel injection mode to the intake-stroke fuel injection mode, specifically from the late lean mode to the stoichiometric feedback operation mode. For this purpose, this system is provided with an ignition timing correction unit 410 for correcting ignition timing of a spark plug 430 as illustrated in FIG. 1.

The ignition timing correction unit 410 serves to retard the ignition timing of the spark plug 430 by a predetermined angle upon switching to the stoichiometric feed back operation mode (stoichiometric operation mode). By such retarding of the ignition timing, a shock which takes place upon switching the operation mode as described above is reduced.

Such retarding of the ignition timing is performed only in the intake-stroke injection mode and is not performed in the compression-stroke injection mode. This is primarily for the reasons to be mentioned hereinafter.

In the compression-stroke injection mode, it is necessary to effect ignition at a timing that a mist of fuel injected into the combustion chamber has been favorably put together in the vicinity of the spark plug owing to upward movement of a piston. Accordingly, a range in which the ignition timing can be set is very narrow. If correction of the ignition timing is performed in a similar manner as in the intake-stroke fuel injection mode when the fuel injection mode is the compression-stroke injection mode, ignition is conducted when a mist of fuel is not favorably located in the vicinity of the spark plug, leading to the potential problem that the state of combustion may be aggravated. Especially when a correction amount is large, a misfire may take place. In this case, the state of operation of the engine may become extremely unstable or the quality of exhaust gas may be deteriorated. This is certainly not preferred.

At the ignition timing correction unit 410, a retard angle as an ignition timing correction amount is set based on detection information from the operation state detection 101 which is composed of the throttle position sensor (TPS) 37, the engine speed sensor 41 and the knock sensor 420 and the like as shown in FIG. 1.

Figure 2:
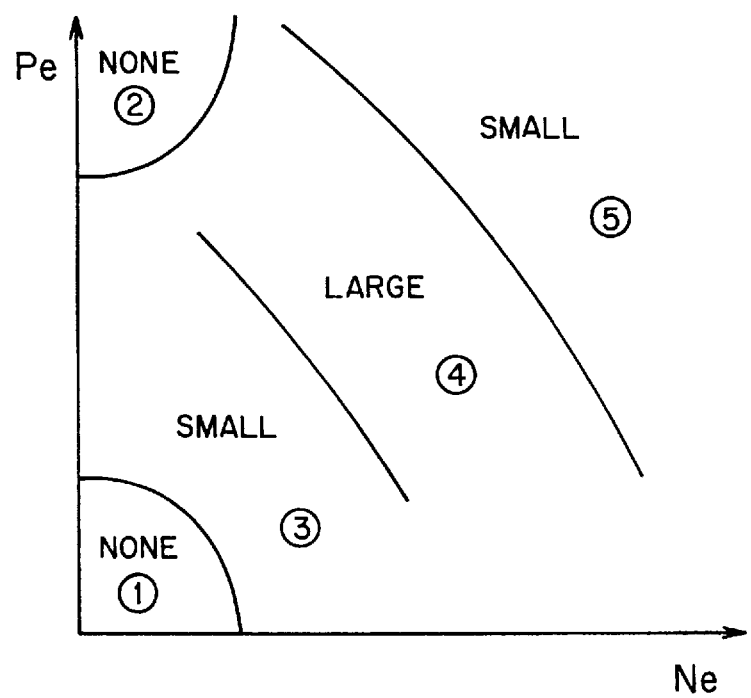
FIG. 2 is a map of ignition timing correction amounts in the ignition timing control system according to the embodiment of the present invention for the in-cylinder injection internal combustion engine.

A retard angle B as an ignition timing correction amount is set basically in accordance with a map such as that shown in FIG. 2. Namely, the basic retard angle B is set in accordance with an operation state of the engine as detected by the operation state detection unit 101, specifically on the basis of an engine speed Ne and a target engine load Pe.

Described specifically, in regions ① and ② in FIG. 2, the basic retard angle B is set 0 (in other words, the basic retard angle B is not set). This is attributed primarily to the reasons to be described hereinafter.

In the region ①, only a small change takes place in the pressure of inducted air upon switching the operation mode. Therefore, the relative torque difference between before and after the switching is small so that only a small torque shock occurs at the engine.

In the region ②, on the other hand, the engine is operated with a retard angle set beforehand at a large value. It is therefore practically unnecessary to set a retard angle newly in this region.

Outside these regions ① and ②, a basic retard angle B is set as shown in FIG. 2, that is, depending on which one of regions ③ to ⑤ the state of operation of the engine falls in. The basic retard angle B is at a relatively small value in the regions ③ and ⑤.

Namely, in the region ③, correction itself of an air quantity is not very large so that a retard angle B of ignition timing is set relatively small like the correction of the air quantity. In the region ⑤, a response lag in the air quantity is relatively small owing to actuation of the second air bypass valve 6 so that a retard angle B of ignition timing is also set relatively small.

Upon switching the operation mode, especially from the late lean mode to the stoichiometric feedback operation mode in the region ④, a relatively large shock tends to take place at the engine because of a lag in the quantity of air to be fed to the combustion chamber. A relatively large retard angle B is therefore set.

Upon switching the operation mode, a target air/fuel ratio A/F is also changed or corrected by the control of an air quantity through the second air bypass valve 6 and the control of a fuel injection quantity through the injector 21 so that a variation in engine torque can be reduced as much as possible.

Described specifically, ECU 16 is provided with a target air/fuel ratio correction unit 401 and the target air/fuel ratio setting unit 402 as shown in FIG. 1. Upon switching the operation mode, a post-switching a target air/fuel ratio A/F is set by the target air/fuel ratio setting unit 402 and, taking precedence over the target air/fuel ratio A/F set by the target air/fuel ratio setting unit 402, correction of the air/fuel ratio-is performed temporarily by the target air/fuel ratio correction unit 401.

Figure 3:
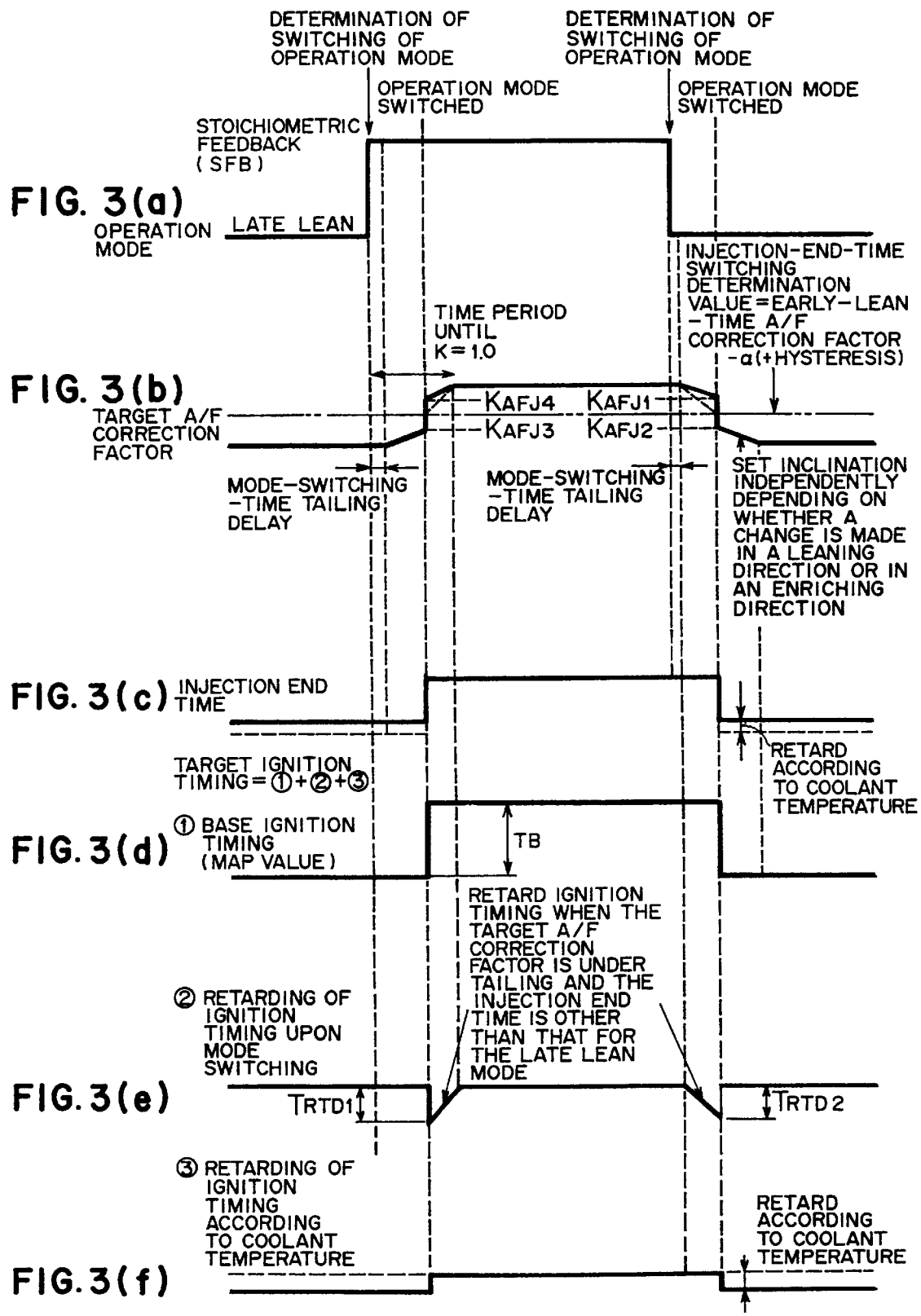
FIG. 3(a) through FIG. 3(f) all diagrammatically illustrate operations upon switching a fuel injection mode in the ignition timing control system according to the embodiment of the present invention for the in-cylinder injection internal combustion engine.

Referring now to FIG. 3, a description will be made about changes of various parameters upon switching from the late lean mode to the stoichiometric feedback operation mode out of such switching operations of the operation mode. As is shown in FIG. 3(*a*), when determination of switching of the operation mode is conducted by ECU 16, a tailing delay upon switching the operation mode is performed for a predetermined time period by the target air/fuel ratio correction unit 401 as depicted in FIG. 3(*b*), and a target air/fuel ratio for the pre-switching fuel injection mode is then corrected toward a value around a switching-time air/fuel ratio KAFJ3. Incidentally, the term "tailing" as used herein means processing which is performed to effect a gradual change.

The switching-time air/fuel ratio KAFJ3 is set between the air/fuel ratio A/F for the pre-switching operation mode and the target air/fuel ratio A/F for the post-switching fuel injection mode. When the target air/fuel ratio A/F is corrected to the switching-time air/fuel ratio as shown in FIG. 3(*b*), the fuel injection timing and the target ignition timing are changed as shown in FIGS. 3(*c*) and 3(*d*) so that the switching of the operation mode is performed practically.

At the time of such switching of the operation mode, the ignition timing is retarded by a predetermined angle as shown in FIG. 3(*e*) so that a torque shock upon mode switching can be reduced.

Further, the retard angle set at this time is then gradually reduced by tailing processing and, subsequent to a predetermined time period, the ignition timing is set at that generally set for the post-switching operation mode.

Incidentally, FIG. 3(*f*) indicates a retard angle of ignition timing according to a coolant temperature of the engine.

A description will next be made about changes of various parameters upon switching from the stoichiometric feedback operation mode to the late lean mode. Substantially the same control as that described above is also performed in this case.

When determination of switching from the stoichiometric feedback operation mode to the late lean mode is made, the switching-time tailing delay is performed for the predetermined time period by the target air/fuel ratio correction unit 401 and the target air/fuel ratio A/F for the pre-switching fuel injection mode is then corrected toward a value around the switching-time air/fuel ratio KAFJI, as shown in FIG. 3(b).

When the target air/fuel ratio A/F has been corrected to the switching-time air/fuel ratio KAFJ1 as illustrated in FIG. 3(b), the fuel injection timing and the target ignition timing are switched as illustrated in FIGS. 3(c) and 3(d) so that the switching of the operation mode is performed practically. Further, when the changing of the target air/fuel ratio is started, the ignition timing is retarded by the predetermined angle so that a torque shock to be produced upon switching the mode is reduced.

Here, the retarding of the ignition timing is started one stroke behind the start of the tailing of fuel. This is to precisely synchronize the tailing of fuel and the retarding of the ignition timing with each other because there is a lag from the injection of fuel until its combustion in the intake-stroke injection mode. When the predetermined time period is counted from the switching of the operation mode, it is only necessary to set the predetermined time period so that it becomes longer than at least the delay period of the target air/fuel ratio.

Further, the retard angle at this time is first gradually increased by tailing processing and after the predetermined time period, is changed at once to the usual ignition timing set for the post-switching operation mode.

Figure 7:
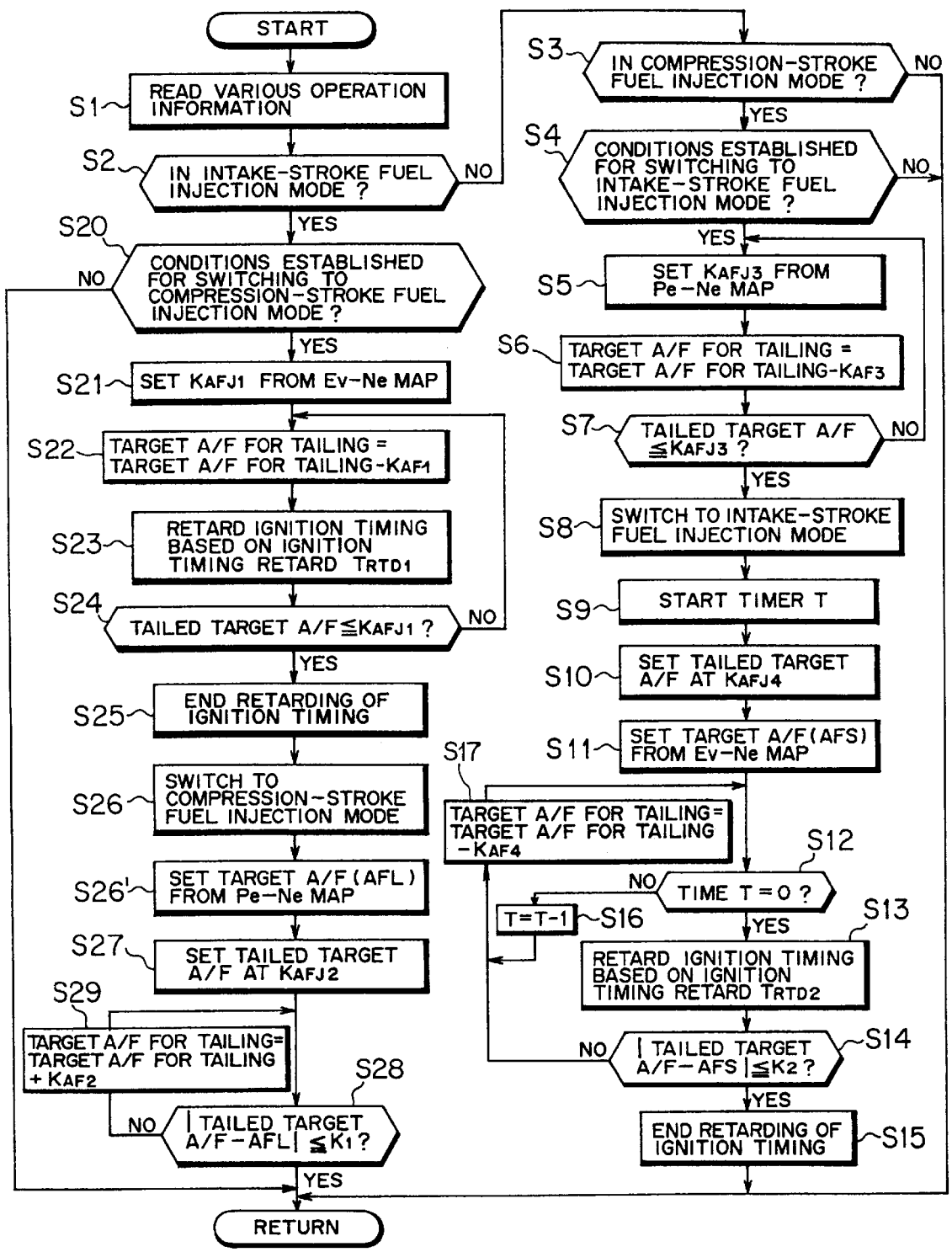
FIG. 7 is a flow chart for illustrating operation of the ignition timing control system according to the embodiment of the present invention for the in-cylinder injection internal combustion engine.
Figure 8:
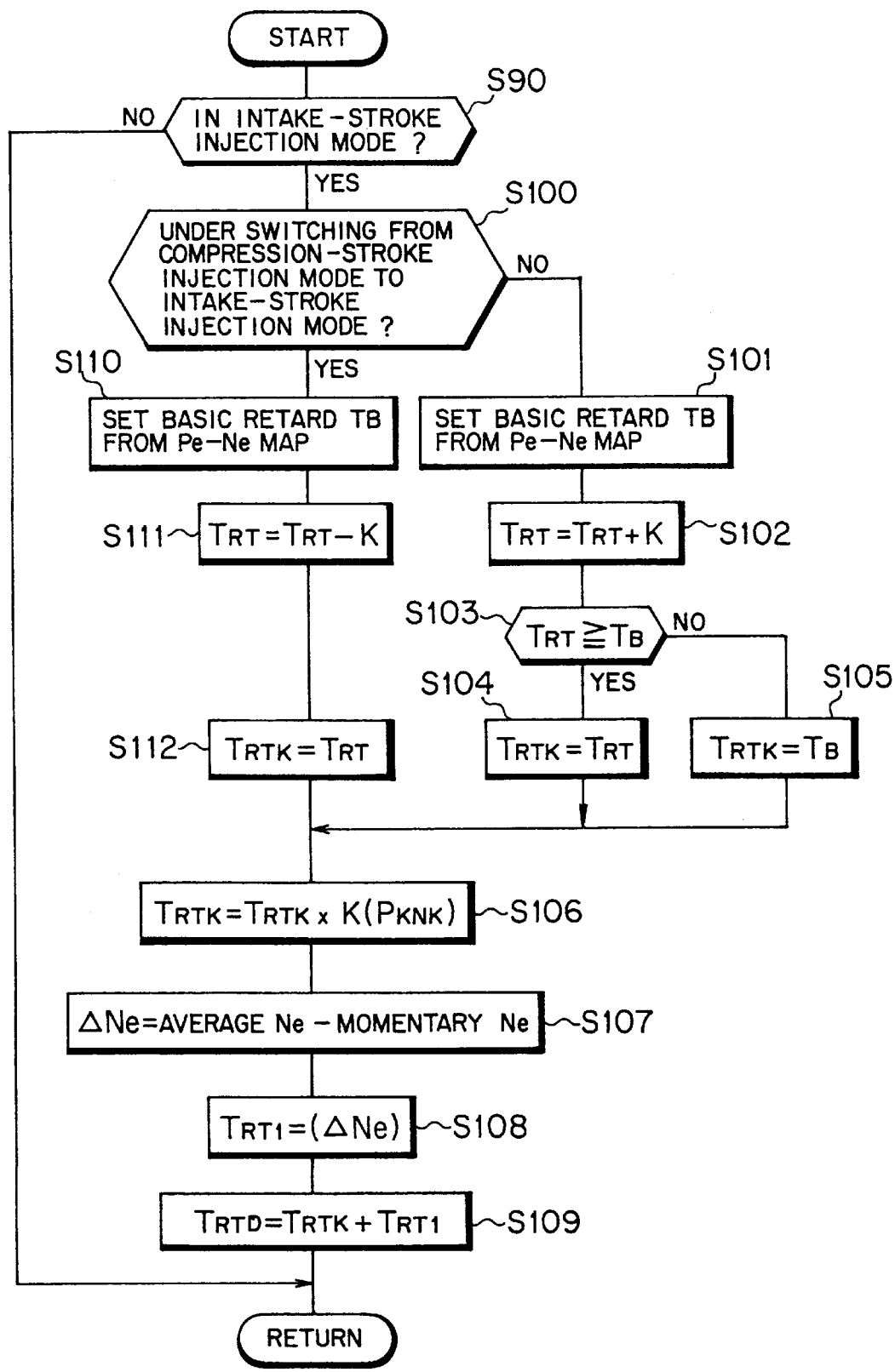
FIG. 8 is a flow chart for illustrating operation of the ignition timing control system according to the embodiment of the present invention for the in-cylinder injection internal combustion engine.

As the ignition timing control system according to the embodiment of the present invention for the in-cylinder injection internal combustion engine is constructed as described above, the system operates, for example, in accordance with the flow charts shown in FIGS. 7 and 8. Described specifically, various operation information is first read in step S1, and it is then determined in step S2 whether or not the engine is currently in the intake-stroke injection mode.

If the engine is determined to be in the intake-stroke injection mode (the early lean mode or the stoichiometric operation mode) in step S2, the routine then advances to step S20 onwards. Unless the engine is determined to be in the intake-stroke injection mode, the routine then advances to step S3 onwards.

A description will now be made about a situation where the routine advances to step S3 onwards. It is determined in step S3 whether or not the engine is currently in the compression-stroke injection mode (late lean mode). Unless the engine is in the compression-stroke injection mode, the engine is in an operation state which is neither the intake-stroke injection mode nor the compression-stroke injection mode, for example, is in a start-up mode or a fuel cut mode, so that the routine returns. If the engine is determined in step S3 to be in the compression-stroke injection mode currently, the routine then advances to step S4 to determine whether or not the conditions for switching to the intake-stroke injection mode have been established. If the switching conditions have been established, the routine advances to step S5. Otherwise, the routine returns.

In step S5, a switching-time target air/fuel ratio KAFJ3 is set in accordance with a target engine load Pe and an engine speed Ne. In step S6, correction of the current target air/fuel ratio A/F is performed. This correction in step S6 is performed by such tailing processing that a predetermined gain KAF3 is subtracted from the current target air/fuel ratio A/F.

It is then determined in step S7 whether or not the current target air/fuel ratio A/F has been reduced to a threshold (third threshold) KAFJ3 or less (A/F≦KAFJ3) by the tailing processing. If A/F>KAFJ3, the routine returns to the above-described step S5 and tailing processing is continued until the current target air/fuel ratio A/F becomes equal to or smaller than KAFJ3 (A/F≦KAFJ3).

If A/F≦KAFJ3 in step S7, the routine then advances to step S8 to perform switching to the intake-stroke injection mode. A count-down of the timer is then started in step S9. Thereafter, the routine advances to step S10, in which the target air/fuel ratio A/F for tailing is set at a threshold (fourth threshold) KAFJ4. In step S11, a post-switching target air/fuel ratio A/F (AFS) is set in accordance with an inducted air quantity Ev and an engine speed Ne.

Next, the routine advances to step S12 to determine whether or not the count T of the timer has reached 0. If T≠0, the routine then advances to step S16, in which the count T is decremented. In step S17, a predetermined gain KAF4 is subtracted from the target air/fuel ratio A/F for tailing and the routine returns to step S12. The routine of step S16 and step 17 is then repeated until the count T of the timer becomes 0 (T=0).

If T=0 is determined in step S12, on the other hand, the routine then advances to step S13, in which the ignition timing is retarded by a retard angle RTD2 as an ignition timing correction amount. A description will be made subsequently about the setting of the retard angle RTD2.

When the absolute value of a difference between the target air/fuel ratio A/F for tailing and the post-switching target air fuel ratio A/F (AFS) is determined to have become a predetermined value $K_2$ or smaller (|target air/fuel ratio A/F for tailing−AFS|≦$K_2$) in step S14, the routine advances to step S15 to end the retarding of the ignition timing. If |target air/fuel ratio A/F for tailing−AFS|>$K_2$ is determined in step S14, the routine then advances to step S17, in which tailing processing is applied to continue retarding of the ignition timing.

If the engine is determined to be currently in the intake-stroke injection mode in step S2, on the other hand, processings of step S20 onwards are performed.

Namely, it is determined in step S20 whether or not the conditions for switching to the compression-stroke injection mode have been established. If the switching conditions have been established, the routine advances to step S21 onwards. Otherwise, the routine returns.

In step S21, a switching-time target air/fuel ratio KAFJ1 is set based on an inducted air quantity Ev and an engine speed Ne. In step S22, correction of the current target air/fuel ratio A/F is performed. This correction in step S22 is performed by such tailing processing that like the above-described step S6, a predetermined gain KAF1 is subtracted from the current target air/fuel ratio A/F (AFL).

Then, in step S23, the ignition timing is retarded by a retard angle RTD1 as a ignition timing correction amount. Like the above-described retard angle RTD2, a description will be made subsequently about the setting of the retard angle RTD1.

It is determined in step S24 whether or not the target air/fuel ratio A/F for tailing has become equal to or smaller than the threshold (first threshold) KAFJ1 (A/F≦KAFJ1) by the tailing processing. If A/F>KAFJ1, the routine then returns to the above-described step S22, and tailing processing is continued until A/F≦KAFJ1.

If A/F≦KAFJ1 is determined in step S24, the routine then advances to step S25 and the retarding of the ignition timing is ended. Switching to the compression-stroke injection mode is then performed in step S26.

Thereafter, the post-switching target air/fuel ratio A/F (AFL) is set in accordance with a target load Pe and an engine speed Ne in step S26'.

Then, the target air/fuel ratio A/F for tailing is set at a threshold (second threshold) KAFJ2 in step S27 and, when the absolute value of a difference between the target air/fuel ratio A/F for tailing and the post-switching target air/fuel ratio A/F (AFL) is determined to have become equal to or smaller than a predetermined value $K_1$ (|target air/fuel ratio A/F for tailing–AFS|≦$K_1$) in step S18, the routine then returns, whereby the switching of the operation mode is ended. If |target air/fuel ratio A/F for tailing–AFL|≧$K_1$ is determined in step S28, the routine then advances to step S29, in which tailing processing is applied so that the target air/fuel ratio for tailing is rendered leaner gradually.

Next, the setting of the retard angles RTD1 and RTD2 as the ignition timing correction amounts will be described with reference to the flow chart depicted in FIG. 8. First, it is determined in step S90 whether or not the engine is currently in the intake-stroke injection mode. If the engine is in the intake-stroke injection mode, the routine then advances to step S100. Otherwise, the routine returns and the control is ended.

In step S100, it is determined whether or not the engine is currently under switching from the compression-stroke injection mode to the intake-stroke injection mode. Unless the engine is determined to be currently under switching from the compression-stroke injection mode to the intake-stroke injection mode in step S100, in other words, if the engine is determined to be currently under switching from the intake-stroke injection mode to the compression-stroke injection mode in step S100, the routine then advances to step S101 onwards. If the engine is determined to be currently under switching from the compression-stroke injection mode to the intake-stroke injection mode, the routine then advances to step S110 onwards.

A description will now be made of the case in which the routine has advanced to step S101. In step S101, a basic retard angle B is set based on a map of engine loads Pe versus target engine speeds Ne.

Then, in step S102, the sum of an ignition timing correction amount (current retard angle) RT under the current operation state and a predetermined gain K is newly set as an ignition timing correction amount RT. In step S103, this correction amount RT and the basic retard angle B are compared.

If the basic retard angle B is equal to or greater than the ignition timing correction amount RT, the routine then advances to step S104, in which the ignition timing correction amount RTK is set at RT. If the basic retard angle B is smaller than the correction amount RT, the routine then advances to step S105, in which the ignition timing correction amount RTK is set at B.

In step S106, the product obtained by multiplying the correction amount RTK with an engine-knock-associated correction gain K(PKNK) is then newly set as a correction amount RTK. In step S107, an engine speed difference ΔNe is next calculated from a difference between an average engine speed Ne during a predetermined sampling period and a momentary engine speed Ne at the time of the current sampling. In step S108, a correction amount RT1 corresponding to this engine speed difference ΔNe is set.

In step S109, the correction amount RT1 set in step S108 is added to the correction amount RTK set in the above-described step S106 so that a retard angle RTD is set. In other words, RTD is set at RT and RT1 (RTD=RT+RT1).

When this retard angle RTD is used upon switching the operation mode from the compression-stroke injection mode (for example, the late lean mode) to the intake-stroke injection mode (for example, the stoichiometric operation mode), it is set as RTD2.

When this retard angle RTD is used upon switching the operation mode from the intake-stroke injection mode (for example, the stoichiometric operation mode) to the compression-stroke injection mode (for example, the late lean mode), it is set as RTD1.

A description will next be made about the case in which the routine has advanced to step S110, in which similar processing as that performed in the above-described step S101 is performed. It is however to be noted that a basic retard angle B set in step S110 is set at a retard angle greater than the basic retard angle set in the above-described step S101, because there is a response lag in a quantity of inducted air to be fed to the combustion chamber as mentioned above and a shock tends to occur upon switching to the intake-stroke injection mode. To reduce this shock, the basic retard angle B is set at such a large retard angle.

In step S111, the balance which has been obtained by subtracting the predetermined gain K from the ignition timing correction amount RT for the current operation state (the current retard angle) is newly set as the ignition timing correction amount RT, and the routine then advances to step S112. In this step S112, the ignition timing correction amount RTK is set at RT (RTK=RT). The routine then advances to step S106, in which control similar to that described above is performed.

Here, a description is made about the above-described knock-associated correction gain K (PKNK) in step S106. The correction gain K (PKNK) is set by knock learning. In the above-described control, the retard angle was set on the basis of the correction gain. If fuel which is used currently is found to have a relatively low octane number by knock learning, the above-described retarding of ignition timing may be inhibited, because in the compression-stroke injection mode, an ignition time is set at a minimum spark advance point (MBT), which is for obtaining a maximum torque, and substantially the same output is hence produced irrespective of the octane number of fuel. In the intake-stroke injection mode, the engine load becomes lower with the octane number when the throttle position is the same. The power output therefore also varies with the octane number. Use of fuel having a relatively high octane number therefore produces a greater shock upon switching the operation mode than use of fuel having a relatively low octane number.

As has been described above in detail, the above-described system performs optimal correction of ignition timing upon switching the operation mode from the compression-stroke injection mode to the intake-stroke injection mode and also from the intake-stroke injection mode to the compression-stroke injection mode, thereby bringing about the advantage that a torque shock can be reduced in a manner suited for each fuel injection mode and the drivability can be improved significantly.

In addition, the correction of ignition timing according to a response lag in a quantity of air makes it possible to precisely perform control of the ignition timing in accordance with an injection quantity of fuel, thereby bringing about the advantage that the drivability can be significantly improved.

Further, an ignition timing correction amount RTD2 which is set by the ignition timing correction unit 410 is set by using an engine speed difference $\Delta Ne$, a degree PKNK of occurrence of engine knocking and an operation region set by engine speeds Ne and target engine loads Pe. This has the advantage that an optimal ignition timing correction amount can be set in accordance with an operation state of the engine.

It is also to be noted that the setting of the correction amount RTD2 of the ignition timing is not limited to the above-described manner. It is sufficient if the correction amount is set using at least any one of these parameters ($\Delta Ne$, PKNK and the operation region set by engine speeds Ne and engine loads Pe).

What is claimed is:

1. An ignition timing control system for an in-cylinder injection internal combustion engine in which a fuel injection mode can be switched between a compression-stroke injection mode, in which an injection of fuel is performed primarily in a compression stroke, and an intake-stroke injection mode, in which an injection of fuel is performed primarily in an intake stroke, in accordance with an operation state of said internal combustion engine, comprising:

an ignition timing correction unit for correcting ignition timing of a spark plug, which is arranged in a combustion chamber, upon switching said fuel injection mode, wherein a correction amount for ignition timing, by which said ignition timing is corrected by said ignition timing correction unit upon switching from said compression-stroke injection mode to said intake-stroke injection mode, is greater than a correction amount for ignition timing, by which said ignition timing is corrected upon switching from said intake-stroke injection mode to said compression-stroke injection mode.

2. The system of claim 1, wherein said internal combustion engine is provided with:

a target air/fuel ratio setting unit for setting a target air/fuel ratio for said fuel injection mode in accordance with an operation state of said internal combustion engine, and a target air/fuel ratio correction unit for correcting a change of said target air/fuel ratio, which has been set by said target air/fuel ratio setting unit, upon switching said fuel injection mode;

said target air/fuel ratio setting unit sets said target air/fuel ratio at an air/fuel ratio leaner than a stoichiometric air/fuel ratio in said compression-stroke injection mode and, in said intake-stroke injection mode, at an air/fuel ratio richer than said target air/fuel ratio for said compression-stroke injection mode;

upon switching said fuel injection mode, said target air/fuel ratio correction unit corrects a target air/fuel ratio for a pre-switching fuel injection mode toward a fuel-injection-mode-switching-time air/fuel ratio, which falls between said target air/fuel ratio for said pre-switching fuel injection mode and a target air/fuel ratio for a post-switching fuel injection mode, and then changes said corrected target air/fuel ratio from a value around said fuel-injection-mode-switching-time air/fuel ratio toward said target air/fuel ratio for said post-switching fuel injection mode set by said target air/fuel ratio setting unit; and in said intake-stroke injection mode, said ignition timing correction unit is actuated upon an elapse of a predetermined time period since commencement of a correction of said target air/fuel ratio toward said mode-switching-time air/fuel ratio by said target air/fuel ratio correction unit.

3. The system of claim 1, wherein said correction amount of said ignition timing as set by said ignition timing correction unit is set based on at least one of a difference in speed of said internal combustion engine, a degree of occurrence of knocking in said internal combustion engine and said operation state of said internal combustion engine.

4. The system of claim 3, wherein said operation state of said internal combustion engine is within an operation region set by at least speeds of said internal combustion engine and values correlated to loads on said internal combustion engine.

* * * * *